F. PARDEE.
VEHICLE SPRING.
APPLICATION FILED JAN. 14, 1915.
1,203,041.
Patented Oct. 31, 1916.
2 SHEETS—SHEET 1.
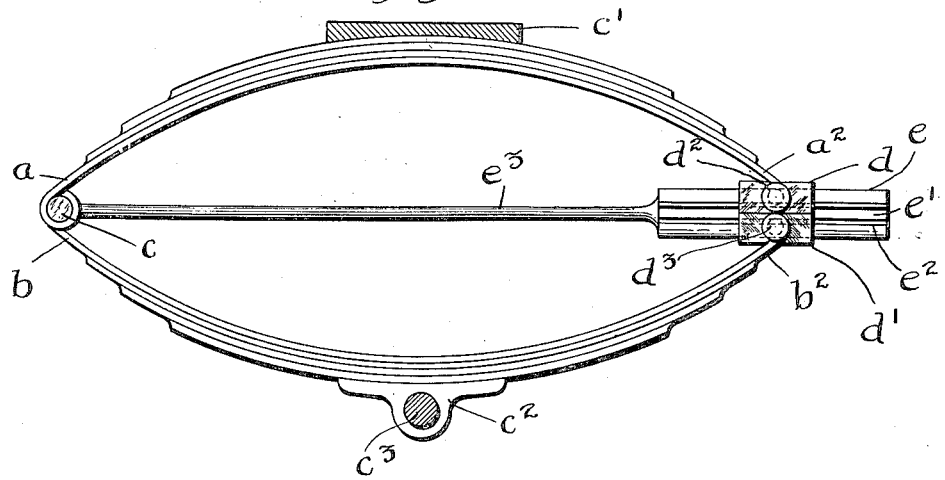
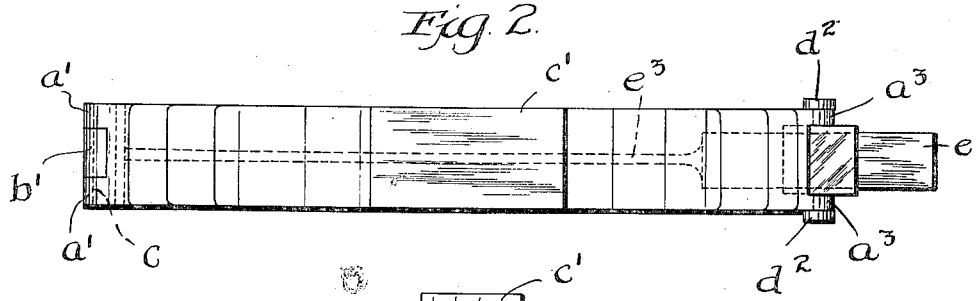
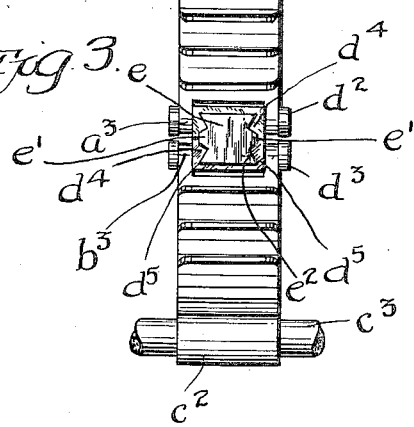
WITNESSES
INVENTOR
Frank Pardee,
BY
ATTORNEY

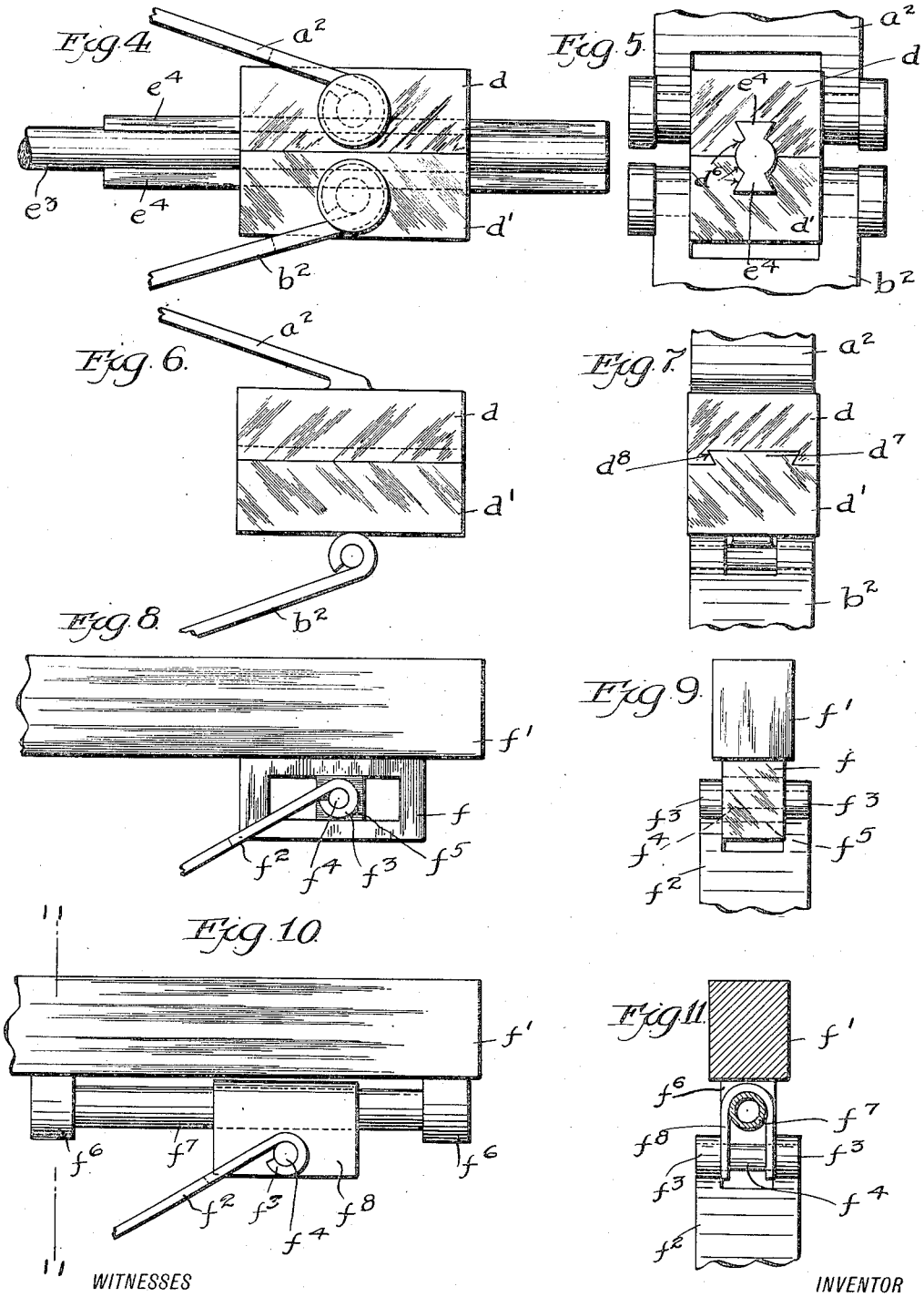

UNITED STATES PATENT OFFICE.

FRANK PARDEE, OF HAZLETON, PENNSYLVANIA.

VEHICLE-SPRING.

1,203,041.

Specification of Letters Patent.

Patented Oct. 31, 1916.

Application filed January 14, 1915. Serial No. 2,104.

*To all whom it may concern:*

Be it known that I, FRANK PARDEE, a citizen of the United States, and resident of the city of Hazleton, county of Luzerne, and State of Pennsylvania, have invented certain new and useful Improvements in Vehicle-Springs, of which the following is a specification, reference being had to the accompanying drawings.

The invention relates to elliptic, semi-elliptic and three-quarter springs used more especially for supporting vehicle bodies, the object being to produce means for controlling the movements of the leaves or spring plates and thus moderating the vibratory actions caused by the distentions and retractions under changing conditions of weight, pressure and other causes which produce a tension of more or less stress and duration.

The invention consists of the combination with a spring-plate or leaf, of a slidable friction-block connected with one end of said plate, and means for retaining and guiding said block, whereby the plate-end is locked against vertical and transverse displacements and enabled to slide, distend and push or draw said block lengthwise, whenever the spring-action overcomes the resistance of the block, as hereinafter more fully described and claimed.

In the drawings Figure 1, is a side elevation of an elliptic spring showing a guide-rod, friction-blocks and connections illustrating the invention; Fig. 2, is a plan view thereof, and Fig. 3, an end view, looking toward the projecting end of the block. Figs. 4 and 5 are respectively a side view and an end view of an elliptic spring, friction-block and guide-rod connections of a modified form. Figs. 6 and 7 are respectively a side and an end view of dovetailed friction-blocks for an elliptic spring without a guide-rod, the upper spring-plate being rigidly secured to the upper friction-block and the lower spring-plate pivotally secured to the lower block. Figs. 8 and 9 are respectively a side and an end view of a friction-block and guide connections with the vehicle frame for one end of the long leaf or plate of a semi-elliptic spring, and Figs. 10 and 11, show another form of connections for a semi-elliptic spring with a vehicle frame.

An elliptic spring, as shown in Figs. 1 to 3, has the ends $a$, $b$, of the long leaves or plates of its upper and lower halves curled over or formed with knuckles $a'$, $a'$, $b'$, so as to be jointed or hinged together, as by a pin $c$. The upper half of the spring carries a saddle or bed-plate $c'$, which connects with and supports the vehicle body, and the lower half rests on and is secured to a bracket $c^2$ which receives or otherwise connects with the axle $c^3$. The hinge-pin $c$ and the connections $c'$, $c^2$ are relatively fixed points and may or may not be used in connection with a radius or distance rod having the usual functions. When both ends of an elliptic spring have friction-block connections, in lieu of a hinged end, as shown, the usual distance-rod should be used to prevent displacement of the vehicle body.

The ends $a^2$, $b^2$ of the long spring-plates are locked against vertical and transverse displacements by the slidable friction-blocks, $d$, $d'$ to which the adjacent plate-ends $a^2$, $b^2$, are connected by knuckles $a^3$, $b^3$ and lugs or pins $d^2$, $d^3$. The blocks $d$, $d'$, preferably have tongue and groove or dovetail connections $d^4$, $d^5$, with a guide-piece $e$, the tongues and grooves $e'$, $e^2$ of which extend horizontally and receive or enter the corresponding parts of the friction-blocks $d$, $d'$. The form of the slide connections is immaterial so long as they are adapted to perform the function of locking the plate-ends $a^2$, $b^2$, vertically and transversely while permitting and guiding their lengthwise movements whenever the tension or pressure is sufficient to overcome the resistance of the friction-blocks $d$, $d'$.

The guide-piece $e$ may be retained adjacent to and in workable relation with the plate-end or ends of an elliptic or semi-elliptic spring by any suitable means for performing the functions stated, but it is shown in Figs. 1 to 3 as being made fast to one end of a guide-rod $e^3$, the other end of which is connected with the hinge-pin $c$, at the opposite end of the spring-plates. When thus connected, the rod $c^3$, has the function of acting on the guide-piece $e$, in the opposite direction from that of the action of the plate-ends $a^2$, $b^2$. When one end of an elliptic spring has the upper and lower plates hinged or joined as at $c$, so that such point of connection becomes fixed relatively to the point of support for the weight, as at $c'$, and the other end of the upper spring plate is free to move lengthwise, the part of the plate between the weight and its connection $d^2$ with the friction-block $d$, will form a lever and the outward and inward thrusts of such lever and friction-block will carry the point of support $c'$, for the weight, and thus shift the same with an easy movement and less jouncing or vibration than in springs having both ends jointed or fixed relatively to the point of support.

A connection of the guide $e$ and friction-blocks $d$, $d'$ is preferably made only at the end of the spring-plate which is permitted lengthwise movement, and in a full elliptic spring the upper spring-plate is preferably given its lengthwise movements independently of the lower spring-plate so that the movements of the vehicle body and the shifting, if any, of the point of support, may be as independent as circumstances permit, of the lower half of the spring which connects with and is affected directly by the axle and wheels of the vehicle. The conditions to be met in different practical applications, will, however, play a part in determining the form and connections for friction-blocks and guide-pieces, for the end of the spring-plate; and in some cases it may be found desirable to have block and guide connections at each end of the upper and lower spring-plates in a full elliptic spring and at each end of a semi-elliptic spring.

The form shown by Figs. 4 and 5, is a modification in which the plate-ends $a^2$, $b^2$ of a full elliptic spring are secured to adjoining friction-blocks, the plate-end $a^2$ being secured to the block $d$, and the plate-end $b^2$ to the friction-block $d'$. In this instance the blocks $d$, $d'$ have recesses $d^6$, $d^6$ partly concave and partly dovetail, so as to receive corresponding guide-pieces $e^4$, $e^4$ on the rod $e^3$, thus making a tongue and groove connection between the friction-blocks and guide-pieces while bringing the blocks into frictional contact with each other.

In the form shown by Figs. 6 and 7, the guide-rod is dispensed with, and the plate-ends $a^2$, $b^2$, connect with the upper and lower friction-blocks, $d$, $d'$ which adjoin and have a tongue $d^7$, and groove $d^8$, dovetail connections, which permit independent movements when, as shown, one of the plate-ends has a rigid connection and the other a pivotal connection with the friction-block for controlling or moderating its lengthwise movements.

In a three-quarter elliptic or semi-elliptic spring the plate-ends may be connected with friction-blocks and guides therefor, so as to have substantially the same actions and functions, the conditions of application in practice being taken into account. In Figs. 8 and 9 semi-elliptic spring connections with the frame of a vehicle are shown. A guide-piece $f$ is attached to the frame $f'$ while the end of the spring-plate $f^2$ connects by knuckles $f^3$, $f^3$ and a pin or lugs $f^4$, with a friction-block $f^5$ retained within a recess or opening in the guide-piece $f$. In Figs. 10 and 11 the frame $f'$ carries brackets $f^6$ which support a guide-rod or pipe $f^7$, over and along with a friction-block or device $f^8$ is guided and moved by the plate-end $f^2$ which connects with the friction-block $f^8$, by knuckles $f^3$, $f^3$ and a pin $f^4$, as shown. In this example, the friction-block $f^8$ is in the nature of a clevis or strap, the bend of which comes in contact with the guide-rod $f^7$, the connection of the knuckles $f^3$, $f^3$ and pin $f^4$ forming a cross-head by which the friction-piece $f^8$ is moved outward or inward by the thrusts of the end of the spring-plate when under tension or released therefrom.

Having thus described the invention, what I claim as new and desire to secure by Letters Patent is:—

1. In a vehicle spring, the combination with a spring-plate, of a slidable friction-block, means for guiding said block and adapted to resist movements thereof, the end of the spring-plate being connected with said block and locked against vertical and transverse displacements whereby said plate may have a lengthwise movement whenever its tension or elasticity is sufficient to overcome the resistance of said block.

2. In a vehicle spring, a spring-plate having one end secured in a fixed relation to the point of support for the weight, in combination with a friction-block connected with the other end of said plate, a guide for said block, said guide being adapted to frictionally resist movements of said block and connected with the opposite plate-end, whereby said block may be moved outwardly and inwardly and the point of support for the weight shifted by tension and elasticity of the spring-plate, and its freedom of movement at the end restricted by said friction-block.

3. In an elliptic vehicle-spring, the combination with upper and lower spring-plates of an upper and lower slidable friction-block suitably retained and guided at one end of said plates, the plate-ends adjacent to said blocks being respectively locked against vertical and transverse movements, whereby the plate-ends may be held in place and have independent lengthwise movements whenever the tension or elasticity of either of them is sufficient to overcome the resistance of the friction-block with which it is engaged.

4. In an elliptic vehicle spring, the combination with upper and lower spring-plates hinged at one end, of a guide-rod connected with said plates at the hinged end, upper and lower slidable friction-blocks at the other end of said rod and having guide connections with the same, the plate-ends adjacent to said friction-blocks being respectively connected with the same, whereby lengthwise movements of the spring-plates may be allowed and controlled according to their tension and elasticity.

FRANK PARDEE.

Witnesses:
S. A. BARBER,
ANNA M. WITTERAN.